April 21, 1931. E. A. JOHNSTON ET AL 1,802,022
COTTON PICKER
Filed April 6, 1927 6 Sheets-Sheet 1

Inventors,
E. A. Johnston
and D. B. Baker,
By H. P. Doolittle
Atty

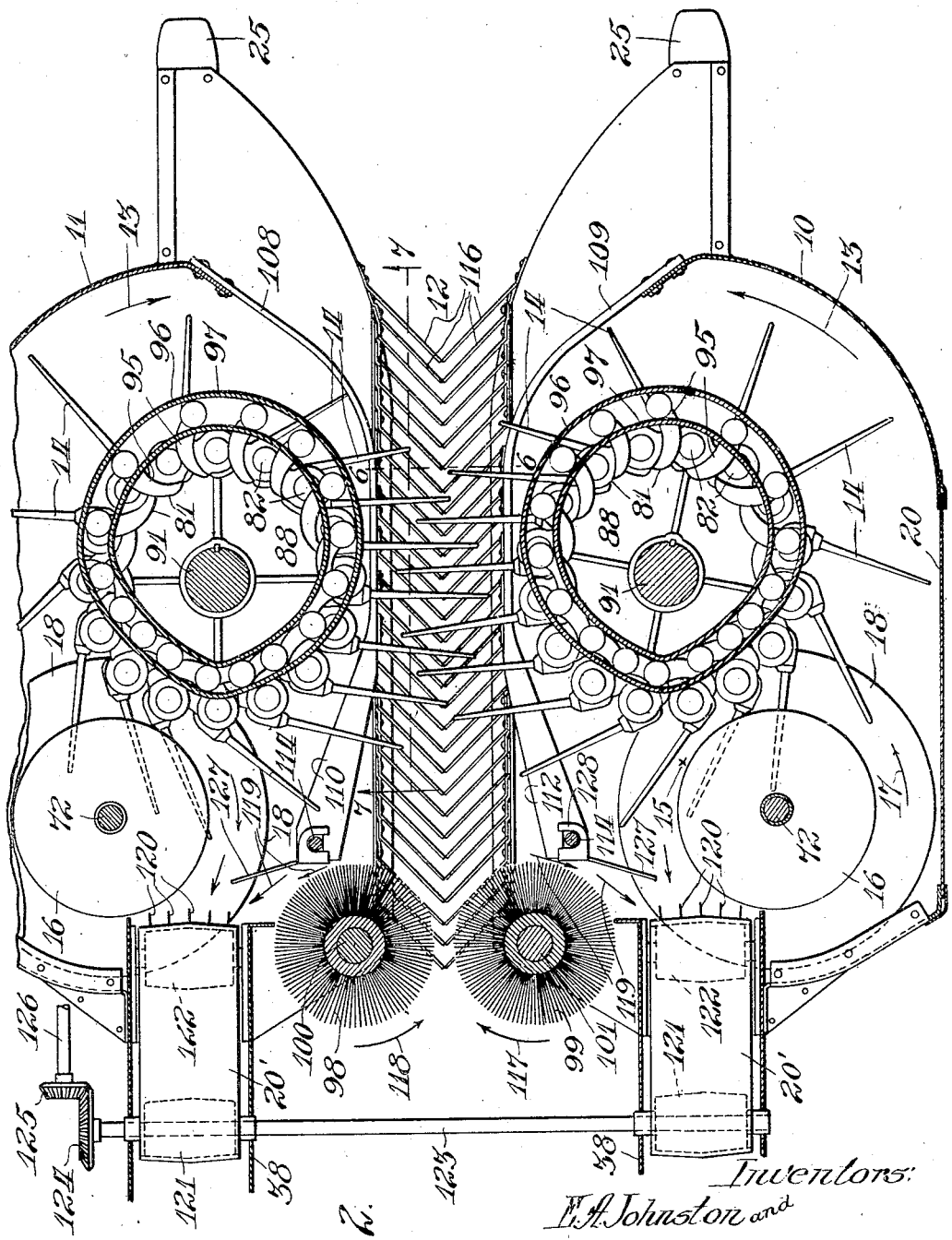

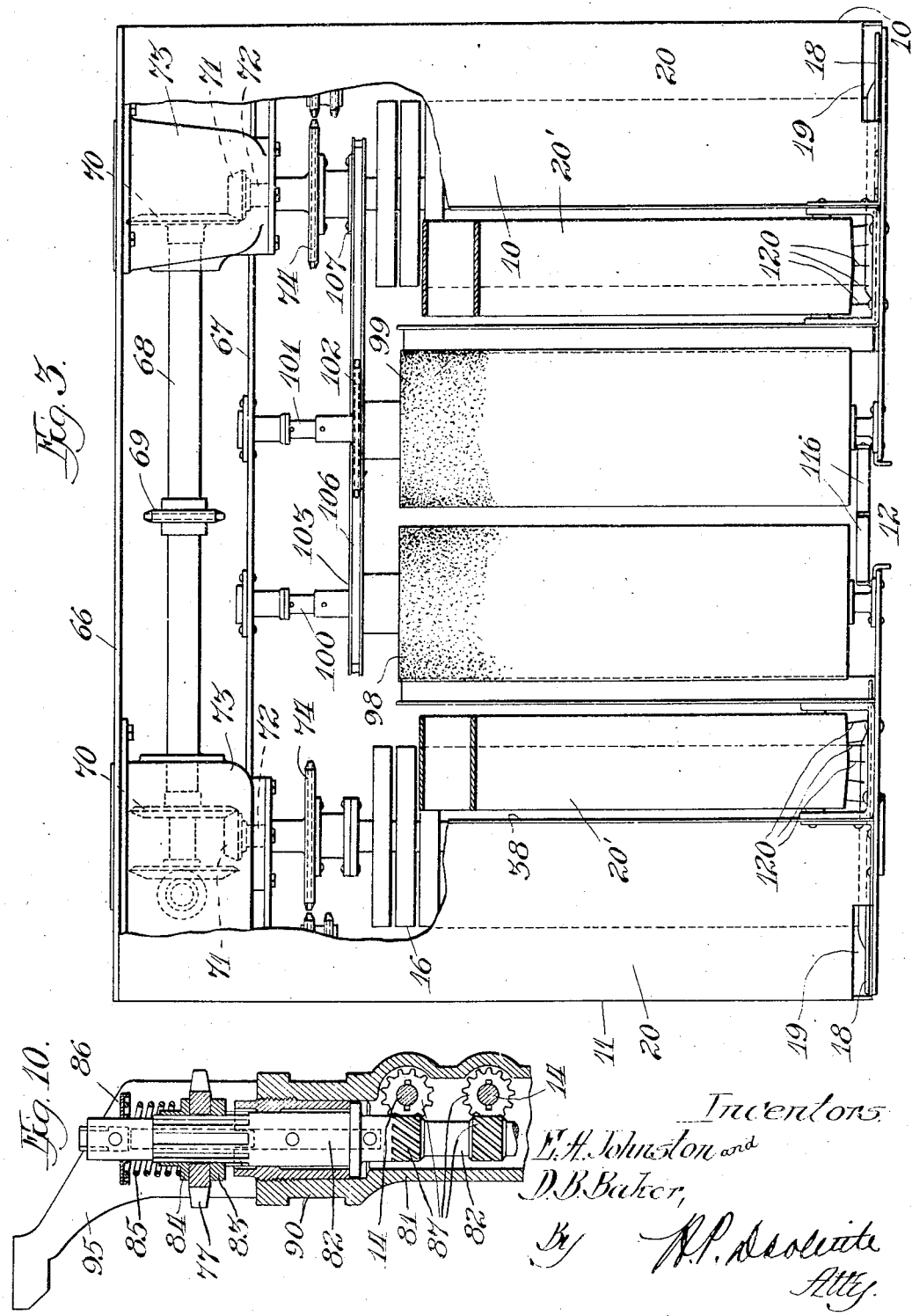

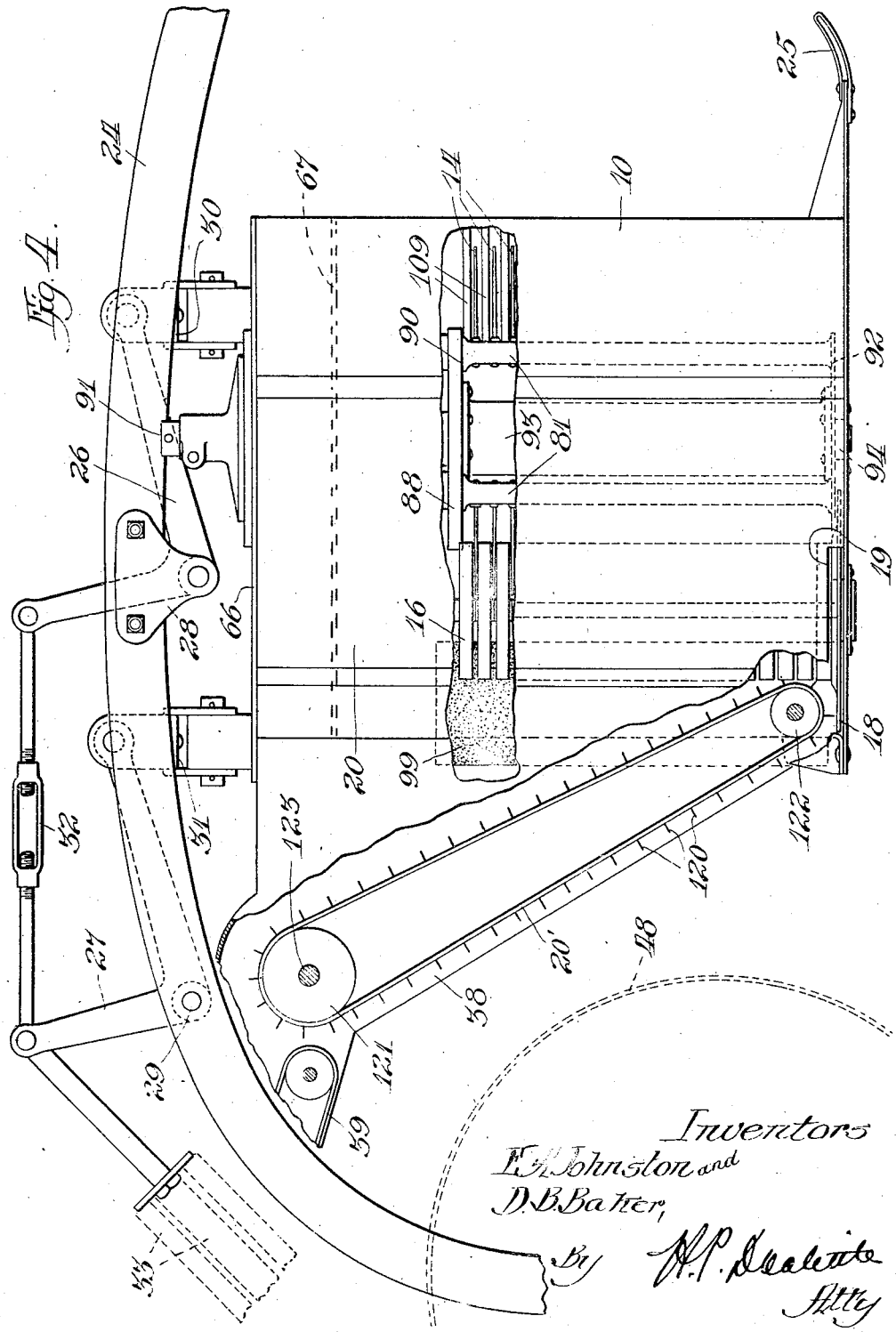

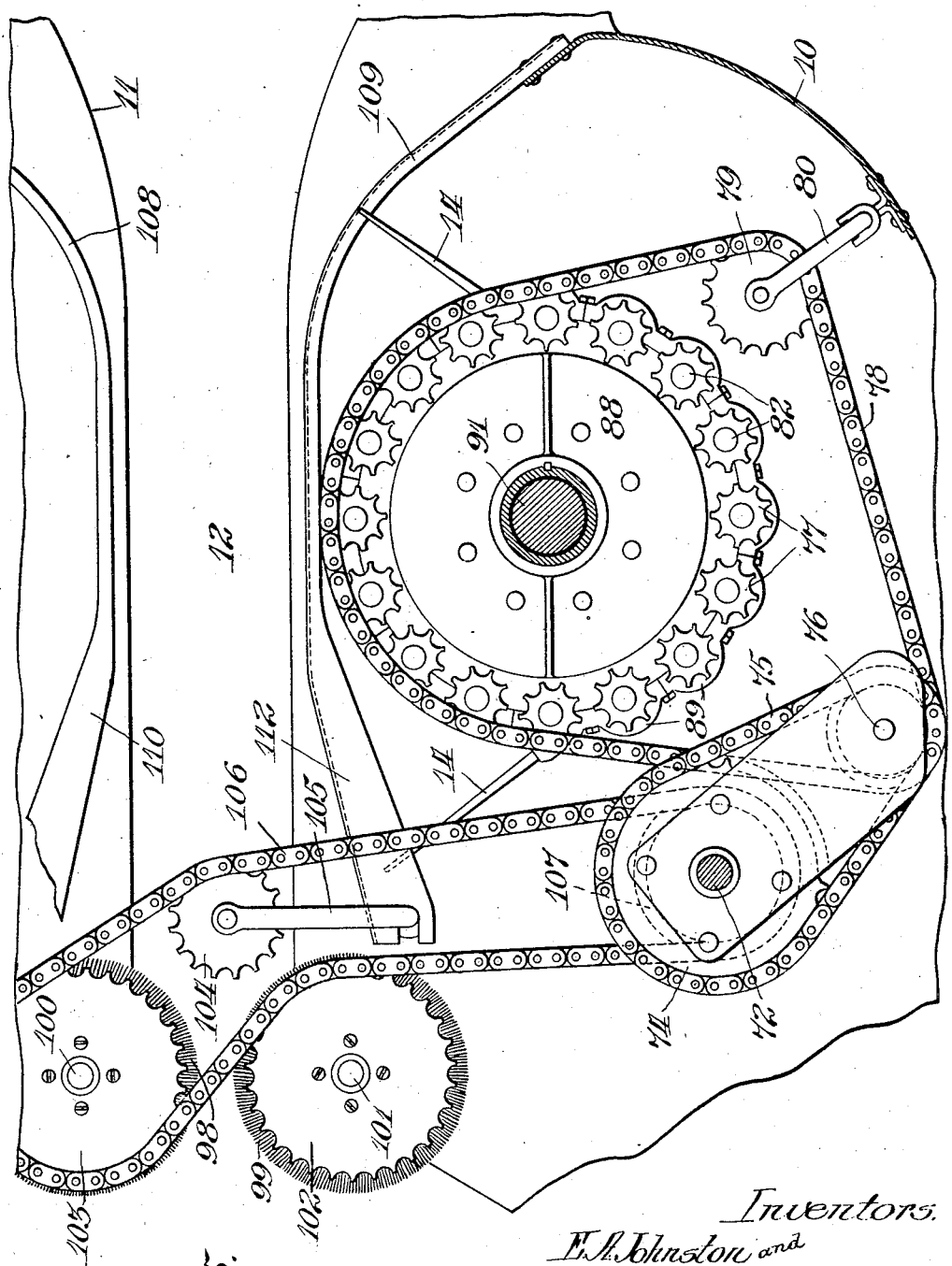

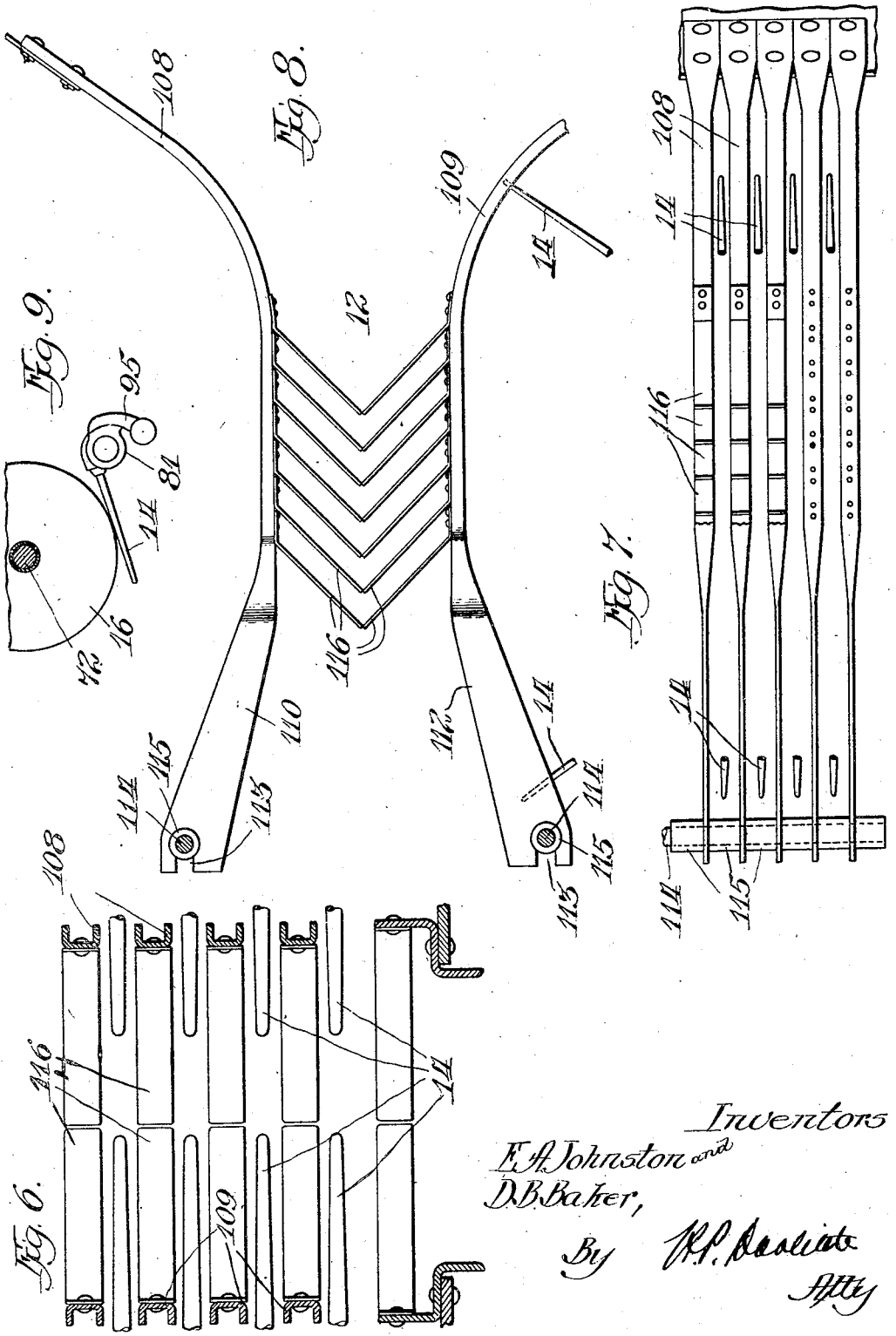

Patented Apr. 21, 1931

1,802,022

UNITED STATES PATENT OFFICE

EDWARD A. JOHNSTON AND DAVID B. BAKER, OF CHICAGO, ILLINOIS, ASSIGNORS TO INTERNATIONAL HARVESTER COMPANY, A CORPORATION OF NEW JERSEY

COTTON PICKER

Application filed April 6, 1927. Serial No. 181,312.

This invention relates to cotton pickers and more particularly to improvements in a cotton picker of the type employing devices for positively removing the cotton from the plants.

An object of the invention is to provide a practicable and successful cotton picker having means positively engaging the cotton on the plants and loosening and separating that cotton from the plants so that it may be removed and collected.

Another object of the invention is to provide a cotton picker having means for removing any cotton which has been loosened and not entirely separated from the plants by the first mentioned means.

A more specific object of the invention is to provide a cotton picker having rotating brushes acting upon the cotton plants after their cotton has been loosened by pickers which have actually engaged the cotton.

The invention is illustrated in the accompanying drawings as embodied in a cotton picker having rotating picker stems and rotating brushes for acting upon the cotton plants after the picker stems have been projected into and withdrawn from the plants.

In the drawings:

Figure 2 is a somewhat diagrammatic horizontal section thru the illustrative machine, showing the arrangement of the picker drums, the stripping mechanism, and the rotating brushes;

Figure 3 is a rear elevation of the illustrative machine with certain of the parts broken away to show the operating connections for the rotating brushes and the stripping devices;

Figure 4 is an enlarged side elevation showing the manner in which the picker drum is supported from the main frame and having certain parts of the housing broken away to disclose the relationship of the picker stems to the stripping devices and to the rotating brushes;

Figure 5 is a view in the nature of a plan, showing the driving mechanism for the picker stems, the stripping mechanism, and the rotating brushes;

Figure 6 is a vertical section taken approximately on the section line 6—6 of Figure 2, looking toward the front of the machine;

Figure 7 is a longitudinal vertical section thru the plant passageway of the machine taken approximately on the section line 7—7 of Figure 2 with certain of the picker stems omitted for the sake of clearness of disclosure;

Figure 8 is a detail view disclosing the relationship of the parts controlling the course of the plants as they pass thru the illustrative machine;

Figure 9 is a detail view illustrating the manner in which the picker stems approach the stripping mechanism; and Figure 10 is a detail view in vertical section, showing the construction of one of the picker bars and the mechanism for driving the individual picker stems.

Figure 1:
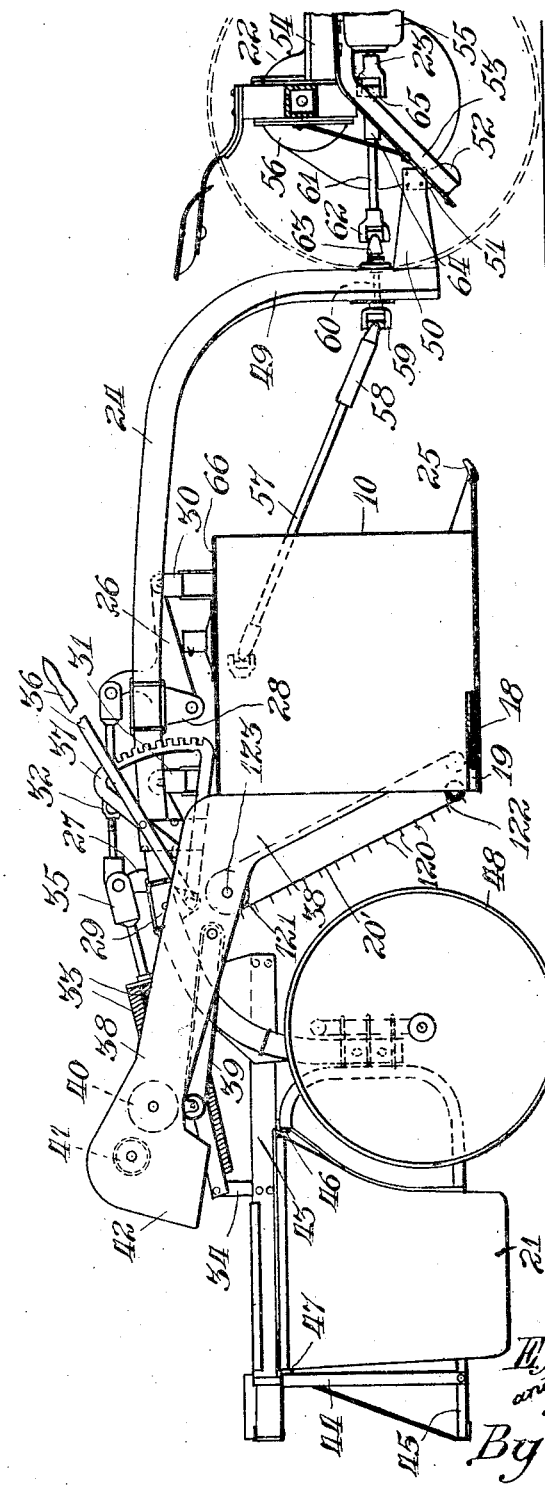
Figure 1 is a side elevation of the illustrative machine showing the general arrangement of the parts.

The illustrative machine comprises drum casings 10 and 11, between which a passage-way 12 is provided for cotton plants. Within each casing is a battery of picker stems, the individual picker stems being caused to travel in the direction of the arrow 13 in Figure 2 of the drawings. During its course of movement, each picker stem 14 is projected into cotton plants within the passage-way 12 and is rotated therein by mechanism hereinafter described, to wind up the cotton.

After a picker stem leaves the plant passage-way 12, it approaches a position indicated at 15 in Figure 2 of the drawings, and, as it further proceeds, it is brought into contact with means for stripping the cotton, herein shown as a rotary doffer 16 moving in the direction indicated by the arrow 17. The picker stems thereafter move thru and past the doffer and around to the starting point where they are again made ready to enter the cotton plants. Assignee's copending application Serial No. 166,829, filed February 9, 1927, covers the cotton doffing mechanism herein disclosed and the relation of the picking mechanism thereto.

One of the great difficulties in providing a successful cotton picker lies in the necessity of eliminating a sufficient proportion of the weeds, trash and dirt which are usually gathered with the cotton by a mechanical picking device. In the present machine leaves, dirt, and trash are ejected from both of the casings 10 and 11 by a separator herein shown as a rotary disk 18, preferably located at the base of the doffer, as disclosed and claimed in a copending application Serial No. 165,583 filed February 3, 1927. The disk 18 preferably rotates with and in the same direction as the doffer, and acts to centrifugally cause separation of the dirt and trash from the cotton by throwing the dirt and trash thru the lateral openings 19, which are provided in the side walls 20 of the drum casings. The cotton stripped from the picker stems by the doffers 16 is delivered to a conveyer 20' which moves the cotton toward collection receptacles 21. A more detailed explanation of the structure and operation of the picking devices will be found below.

Referring to Figure 1 of the drawings, the picker mechanisms, including the picker drums and the drum casings 10 and 11, are suspended from a wheel supported frame which is directly connected at its forward end to a tractor 22. As also illustrated in this figure of the drawings, power is transmitted from the power take-off 23 of the tractor to the operating parts of the picker mechanism.

The illustrative picker mechanism is preferably connected with an arched frame 24 so that it may be adjusted vertically with respect to the frame and the ground. In Figure 1 of the drawings, the picker mechanism is shown in elevated or in inoperative position. In operation, the picker mechanism is lowered so that the shoes 25 ride along the surface of the ground. The picker mechanism is also preferably mounted so that it is free to swing laterally with respect to the frame 24. The devices whereby the picker mechanism is mounted in the manner above indicated include bell cranks 26 and 27 pivotally mounted upon fixed frame supports 28 and 29. The forwardly projecting ends of the bell cranks are pivoted on transverse axes to yokes 30 and 31, which are pivotally associated with the picker mechanism on an axis running longitudinally of the machine, or in the direction of the path of travel of the machine. The upper ends of the bell cranks 26 and 27 are preferably adjustably connected by a turnbuckle 32, and, for the purpose of substantially counterbalancing the picker mechanism when it is in operation, springs 33 are provided. These springs are anchored to a fixed part of the machine herein illustrated as the upright 34. The other ends of the springs are associated with a yoke 35 which is pivoted to the rear bell crank, as clearly shown. The bell cranks are adjusted by means of the lever 36 which is preferably non-rotatively mounted about the axis of one of the bell cranks. A fixed detent bracket 37 co-operates with the lever 36 to hold the latter in any desired position.

The machine illustrated in Figure 1 of the drawings includes a rearwardly and upwardly extending casing 38, which partially houses the elevator 20' and is preferably rigidly secured to a drum casing so as to swing with the picker mechanism. There is preferably such a casing on each side of the frame, the relative positions of the casings being shown in Figure 2 of the drawings. Referring again to Figure 1, a conveyer 39 moves the cotton rearwardly thru the casing 38 and toward a carding wheel 40, which elevates the cotton into such a position that it may be acted upon by blasts of air produced by the blower 41. From the conveyer 38 the cotton drops downwardly from the spout 42 into the collection receptacle 21. This receptacle is associated with the frame in such a way that it may be easily replaced by an empty receptacle. In the illustrative structure, rearward frame extensions 43 together with the frame work comprising members 44 and 45 afford supports for parallel tracks 46 and 47 upon which the receptacle is slidably supported.

It will be noticed from an inspection of Figure 1 that the frame 24 is upwardly arched, the downwardly extending rearward leg of the frame being supported by ground wheels 48, and the forward downwardly extending leg of the frame 49 carrying a bracket 50, which is preferably provided with a pivotal supporting member 51 received by a correspondingly shaped socket 52, which is in turn carried by a frame extension 53 of the tractor. The extension 53 is secured to the main frame 54 of the tractor at a point in proximity to the transmission 55 and extends underneath the rear axle housing 56.

The transmission devices for connecting the power take-off 23 of the tractor with the picker mechanism include telescoping shaft sections 57 and 58 extending from a driven element in the picker mechanism to a universal joint 59, a part of which is non-rotatively mounted upon a short drive shaft 60 journaled within the downwardly extending leg 49 of the cotton picker frame. The forward end of the shaft 60 is connected to a telescoping shaft section 61 by means of universal joint members 62 and 63. The shaft section 61 cooperates with the telescoping section 64 which is connected with the power take-off 23 by a universal joint device 65.

Beneath the upper wall 66 of the picker mechanism is an intermediate horizontal wall 67. Between these two walls suitable gearing for driving the picker mechanism and the doffer is provided.

This gearing includes a transverse shaft 68 which is driven by a sprocket wheel 69 fixed thereon. This sprocket wheel may be suitably connected with the driving parts which are operatively connected with the telescoping shaft 57. At the ends of the shaft 68 are bevel gears 70 meshing with bevel pinions 71 which are fixed upon vertical shafts 72 journaled in the lower portions of the gear casings 73. In the illustrative machine, these shafts are the devices for driving the stripping mechanisms and they are located directly above the latter so as to support the stripping mechanisms from their upper ends. Arranged beneath the bevel pinions 71 and fixed so as to rotate therewith are sprocket wheels 74, connected by sprocket chains 75 with a sprocket wheel upon a countershaft 76, this shaft having an additional sprocket wheel fixed thereon which drives the picker stem sprocket wheels 77 thru the intermediacy of the sprocket chain 78. The sprocket chain 78 is held out of contact with a predetermined number of sprocket wheels 77 by means of an idler sprocket 79 supported by a bracket 80 from the wall of the picker drum casing 10. The position at which the bracket 80 is secured to this wall determines the number of sprocket wheels 77 which are not driven by the chain 78 at any particular time.

Beneath the wall 67 the picker stems are located, as indicated in Figure 4 of the drawings. The picker stems are rotatively mounted in vertically arranged picker bars 81, the particular construction by which the picker stems are supported in the picker bars being shown in the drawings, Fig. 10. Each picker bar is constructed in the form of an upright cylindrical gear casing rotatively housing a vertical shaft 82. This shaft is connected to the sprocket wheel 77 at its upper end so as to be driven by the latter. The preferred devices for connecting the sprocket wheel with the shaft consists of the parts 83, 84, 85 and 86 of a spring pressed friction slip clutch releasable when an abnormal resistance is encountered by the picker stems. The rotatable shaft 82 is operatively connected to the picker stems 14 by gearing 87 carried within the picker bar housing which advantageously forms a lubricant retaining casing.

The picker bars are arranged in circular formation, as is indicated in Figure 5 of the drawings, the picker bars being here shown as supported in circular arrangement by an upper drum head 88 which at its periphery has removable bearing elements 89 for co-acting with the bearing groves 90 near the upper end of the picker bars. The drum head 88 is driven by a central shaft 91 connected by suitable gearing to the telescoping shaft 57. The picker bars are supported at their lower ends by a lower drum head 92 which is rigidly connected by a central column 93 to the upper drum head. The lower drum head is rotatively centered in the bottom wall of the drum housing 10 by a pilot bearing 94.

Cam arms 95 at the upper ends of the picker bars have ends guided between the cam tracks 96 and 97 for governing the angular positions of the picker stems with relation to the plant passage-way and the stripping mechanism.

Located at the rearward end of the passage-way 12 are rotating brushes 98 and 99 of upright, cylindrical formation. These brushes are carried by shafts 100 and 101 which are driven in opposite directions by means of the sprocket gearing particularly shown in Figure 5. This sprocket gearing includes sprocket wheels 102 and 103 and an idler sprocket 104, the latter being carried by a pivoted support 105. All of these sprocket wheels are engaged by a sprocket chain 106 which is trained around the sprocket wheel 103 and has one of its runs in engagement with the sprocket wheel 102. The sprocket chain 106 is driven by a sprocket wheel 107 non-rotatively fixed with relation to the bevel pinion 71 and the sprocket wheel 74. The particular arrangement of devices just described is clearly shown in Figure 5 of the drawings.

The throat, or plant passage-way, of the illustrative machine is formed by vertical series of compressor bars 108 and 109. As clearly indicated in Figures 2, 5 and 8 of the drawings, these bars are forwardly divergent at the front of the machine so that they may act as guides to conduct plants into the passage-way 12 and at the same time compress the plants. The bars 108 and 109 are vertically spaced so as to provide substantially horizontal passage-ways thru which the picker stems are projected into and withdrawn from the plants. These bars are advantageously formed of channel sections, as indicated in Figure 6, the rearward ends of the bars being flattened and widened to provide the reinforcing sections 110 and 112. These sections are slotted at their ends as indicated at 113. This construction facilitates the assembly of the illustrative machine, the bars 108 and 109 being slipped over the vertical supporting rods 114. Spacing collars 115 hold the bars in correctly vertically spaced positions. At their forward end the bars 108 and 109 are secured to the casings 10 and 11.

For the purpose of centering plants within the passage-way 12, rearwardly divergent spring members 116 are secured to the inner sides of the bars 108 and 109, as clearly indicated in Figures 6 and 8 of the drawings. These spring members also function to assist the winding up of the cotton upon the picker stems by their tendency to move the bolls transversely of the passageway 12. After the cotton plants have passed thru the zone of compression indicated by the series of members 116 in Figure 8 of the drawings, the plants are allowed to expand, due to the rearward divergence of the sections 110 and 112. This action presents greater surfaces of the plants to the action of the rotating brushes 98 and 99, which remove any cotton which has been loosened by the picker stems.

The rotating brushes 98 and 99 turn in the direction indicated by the arrows 117 and 118 so as to throw loose cotton in the directions indicated by the arrows 119, the cotton being thrown in such positions that it is caught by the spikes 120 upon the conveyers 20'.

The conveyers 20' are supported upon rollers 121 and 122 and are driven by a transverse shaft 123 upon which are preferably located the upper rollers. The shaft 123 is driven by bevel gears 124 and 125 thru power suitably transmitted from the shaft 57 to the shaft 126.

For adequately guiding the cotton as it is thrown from the brushes 98 and 99 toward the conveyers 20', the walls or baffles 127 are shown located between the respective brushes and the corresponding batteries of picker stems. In the illustrative machine these walls are secured to supports 128 which straddle the rods 114 at the desired number of positions.

The copending patents to Johnston et al. 1,727,708 and 1,727,709, September 10, 1929, and 1,737,850, December 3, 1929, cover other features of the machine herein disclosed.

While the invention has been described with particular reference to a certain structure, it is to be understood that it is not limited thereto, but that it is of a scope commensurate with the scope of the appended claims.

What is claimed as new is:

1. Mechanism for separating cotton lint from plant bodies comprising, in combination, picker stems, means for projecting the picker stems into cotton plants and withdrawing them therefrom to collect and loosen the cotton lint, and a rotatable brush located in following relation to the picker stems and acting upon the plants to remove the loosened lint therefrom after the picker stems have been withdrawn from the plants.

2. A cotton treating machine comprising, in combination, a transportable support formed with a passage-way in which cotton plants are received as the machine traverses the ground, means for guiding cotton plants into the passage, compressor elements for compressing the plants within the passage, picker stems, means for projecting the picker stems to positions within the passage, means for withdrawing the picker stems from the passage-way, means for stripping the cotton from the picker stems and throwing the cotton to a delivery position, divergent portions on said compressor elements extending rearwardly of the paths of movement of the picker stems for releasing the cotton plants from compression while and after the picker stems are being withdrawn therefrom, and a rotating brush near the rearward end of the passage-way for acting upon the plants after they have released so as to remove any loose lint therefrom and throw it to the same delivery position to which the stripping means delivers cotton.

3. A cotton picker of the class described comprising, in combination, a transportable support, cotton harvesting mechanism carried by the support so as to provide a plant passage-way and having picking stems projectable within the passage-way for loosening the cotton lint, and a rotatable brush located at the rear end of the passage-way in position to act upon the plants before they leave the passage-way, said brush acting to remove any loose cotton not removed by said picking stems.

4. A cotton picker comprising, in combination, a transportable support forming a plant passage-way, picker mechanism located alongside said passage-way including picker stems projectable within the passage-way as it is traversed by the plant, a vertically arranged rotating brush located at the end of the passage-way for acting upon cotton plants as they pass therethru, means for rotating said brush, and means affording a passage-way for the cotton lint separated from the plants by said brush.

5. A cotton picker comprising, in combination, a transportable support forming a plant passage-way, means on each side of the passage-way for guiding plants to the passage-way and for compressing the plants while they traverse the passage-way, additional means secured to the walls of said passage-way for centering the plants as they traverse the passage-way, lint collecting means operating in the passage-way during compression of the plants, rearwardly diverging walls at the rearward end of the passage-way for permitting the expansion of the plants after they have been compressed, and a brush located at the rearward end of the passage-way and acting as auxiliary collecting means to remove residual cotton lint from the plants before they leave the machine.

6. A cotton picker comprising, in combination, a transportable support forming a plant passage-way, a battery of picker stems on one side of said passage-way, oppositely rotatable vertically arranged brushes at the rear end of the passage-way, means for rotating the picker stems and projecting them within the passage-way during the operation of the machine, a stripper or doffer, doffer driving means, and power transmitting connections connecting the doffer driving means with the picker stem operating means and for connecting the former with the rotating brushes for operating the latter in opposite directions.

7. A cotton picker comprising, in combination, spaced casings providing a plant passage-way therebetween, picker mechanism comprising traveling picker stems for picking cotton from plants as they traverse the passage-way and transferring the cotton to points within the casings, and vertically arranged rotating brushes located at the end of the passage-way for acting upon opposite sides of plants passing therethru, said brushes being partially located within said casings.

8. A cotton picker comprising, in combination, horizontally spaced batteries of picker stems providing a plant passage therebetween, means for projecting the picker stems into the plants as they enter said passage and withdrawing them from the plants after the cotton is wound thereon, means for rotating the picker stems while they are in the plants, and means acting on the cotton plants after the picker stems recede therefrom for removing any cotton still remaining on the plants.

9. A cotton treating machine comprising, in combination, a transportable support formed with a passage-way in which cotton plants are received as the machine traverses the ground, means for guiding cotton plants into the passage, compressor elements for compressing the plants within the passage, picker stems, means for projecting the picker stems to positions within the passage, means for withdrawing the picker stems from the passage-way, means for stripping the cotton from the picker stems and throwing the cotton to a delivery position, rearwardly diverging portions of the compressor elements located rearwardly of the paths of movement of the picker stems for permitting the cotton plants to expand while and after the picker stems are being withdrawn therefrom, and rotating brushes located rearwardly of the diverging portions of the compressor elements and near the rearward end of the passage-way for acting upon the plants after they have expanded so as to remove any loose lint therefrom and throw it to the same delivery position to which the stripping means delivers cotton.

10. A cotton picker comprising, in combination, a structure affording a plant passage-way, picker stems, means for projecting the picker stems into the passage-way, means for rotating the picker stems, means for withdrawing the picker stems from the passage-way, means for removing cotton from the picker stems after they are withdrawn from the passage-way, means acting upon the material stripped from the picker stems to separate leaves and other plant parts from cotton lint and eject the plant parts other than the lint, gleaning means located rearwardly of the picker stems and acting upon the cotton plants after the picker stems have been withdrawn therefrom to remove any loose lint on the plants, structure affording a passage-way leading from said last-mentioned means to said separating and ejecting means, and means for operating the gleaning means so that lint will be propelled through said passage-way to the ejecting means.

11. A cotton picker comprising, in combination, a transportable structure formed to provide a plant passage-way, cotton picking means located on one side of said passage-way and including elements which are projected into the passage-way and subsequently withdrawn therefrom, means for guiding cotton plants to the passage-way, means for compressing the plants within the passage-way, rearwardly diverging walls formed near the rearward end of the passage-way to permit the plants to expand after they have been compressed, a casing at one side of the passage-way, an upright lint gathering conveyer for removing cotton lint from the casing, means for projecting the picking elements into the passage-way, means for withdrawing said elements into the casing, means for stripping said elements of the material which they have gathered, means for propelling the picked material toward the conveyer, an ejector for ejecting leaves and trash from the casing, gleaning means located in following relation to the picker mechanism and at one side of the conveyer and ejector for acting on the cotton plants after they have expanded, means between the conveyer and the gleaning means forming a passage-way leading to the ejector and the conveyer, and means for causing the gleaning means to discharge cotton lint into said passage-way and towards the conveyer and the ejector.

12. A cotton picker comprising, in combinaion, a structure affording a plant passage-way, picker stems, means for projecting the picker stems into the passage-way, means for rotating the picker stems, means for withdrawing the picker stems from the passage-way, a doffer for removing cotton from picker stems after they are withdrawn from the passage-way, a separator and ejector acting upon the material stripped from the picker stems to separate leaves and other plant parts from cotton lint and eject the plant parts other than the lint, a rotating brush-like structure located in following relation to the picker stems and acting upon the cotton plants after the picker stems have been withdrawn therefrom to remove any loose lint on the plants, walls forming a passage-way leading from said brush-like structure to the separator and ejector, and means for rotating said structure so that lint will be propelled through said passage-way to the ejector.

In testimony whereof we affix our signatures.

EDWARD A. JOHNSTON.
DAVID B. BAKER.